(12) United States Patent
Mishima

(10) Patent No.: US 9,022,887 B2
(45) Date of Patent: May 5, 2015

(54) CLIP-TYPE TENSIONER

(75) Inventor: Kunihiko Mishima, Nabari (JP)

(73) Assignee: Borg Warner Inc., Auburn Hills, MI (US)

( * ) Notice: Subject to any disclaimer, the term of this patent is extended or adjusted under 35 U.S.C. 154(b) by 551 days.

(21) Appl. No.: 13/003,806

(22) PCT Filed: Jul. 15, 2009

(86) PCT No.: PCT/US2009/050693
§ 371 (c)(1),
(2), (4) Date: Jan. 12, 2011

(87) PCT Pub. No.: WO2010/011544
PCT Pub. Date: Jan. 28, 2010

(65) Prior Publication Data
US 2011/0111899 A1    May 12, 2011

(30) Foreign Application Priority Data
Jul. 24, 2008 (JP) .................. 2008-190384

(51) Int. Cl.
*F16H 7/08* (2006.01)
(52) U.S. Cl.
CPC ...... *F16H 7/0848* (2013.01); *F16H 2007/0806* (2013.01); *F16H 2007/0853* (2013.01); *F16H 2007/0855* (2013.01)

(58) Field of Classification Search
CPC .................. F16H 2007/0853; F16H 2007/0855
USPC .................................................. 474/110, 111
See application file for complete search history.

(56) References Cited

U.S. PATENT DOCUMENTS

| | | | | |
|---|---|---|---|---|
| 5,931,754 | A | * | 8/1999 | Stief et al. ..................... 474/109 |
| 7,571,632 | B2 | * | 8/2009 | Yamamoto et al. ......... 72/370.21 |
| 8,277,347 | B2 | * | 10/2012 | Barrette et al. ............... 474/101 |
| 2003/0171178 | A1 | | 9/2003 | Maino |
| 2004/0102273 | A1 | * | 5/2004 | Namie et al. .................. 474/110 |
| 2006/0160645 | A1 | | 7/2006 | Markley |
| 2011/0287880 | A1 | * | 11/2011 | Hayami et al. ................ 474/111 |

FOREIGN PATENT DOCUMENTS

| | | | |
|---|---|---|---|
| JP | 2001-146946 | * | 5/2001 |
| JP | 2006-234088 | | 9/2006 |
| JP | 2010-286090 | * | 12/2010 |

OTHER PUBLICATIONS

English Machine Translation of JP 2001-146946.*

* cited by examiner

*Primary Examiner* — William E Dondero
*Assistant Examiner* — Diem Tran

(57) ABSTRACT

A clip-type mechanism for tensioning slack in a chain. A spring-biased piston is positioned in a bore in a housing. A ratchet rack is positioned on the piston, along with a clip member. A recess in the housing bore has an annular member with a hardened surface to reduce wear.

4 Claims, 3 Drawing Sheets

CLIP-TYPE TENSIONER

TECHNICAL FIELD

The present invention relates to a tensioner for producing tension in a chain, and more specifically to a clip-type tensioner having a ratchet mechanism.

BACKGROUND OF THE INVENTION

Clip-type tensioners, as they are known, have been used in the past as chain tensioners. A clip-type tensioner consists of a housing, a piston which is slidably supported in a hole of the housing, a spring for urging the piston so as to protrude from the hole, and a ratchet mechanism. The ratchet mechanism has a number of rack teeth on the outer periphery of the piston, a clip which engages with the rack teeth, and a recess on the inner peripheral surface of the housing. One example is shown in FIG. 1 of Japanese Unexamined Patent Application Publication 2005-98420. The recess on the inner peripheral surface of the housing has a front end face which comes into contact with the clip when the piston advances, allowing the piston to advance, and a rear end face (seat face) which comes into contact with the clip when the piston retracts, thereby holding the clip between the rack teeth and restricting retraction of the piston.

When slack is produced in the chain during operation, the piston advances toward the chain under the elastic repelling force of the spring and protrudes outside the housing The clip which has engaged with the rack teeth on the outer periphery of the piston comes into contact with the front end face of the recess at this point, which means that the piston is allowed to advance. On the other hand, when tension in the chain increases, the excessive pressing force from the chain causes the piston to retract, pushing it into the housing The clip which has engaged with the rack teeth on the outer periphery of the piston comes into contact with the rear end face of the recess at this point, which means that retraction of the piston is restricted.

However, with the conventional clip-type tensioner described above, when the piston has been pushed into the housing, the clip collides with the rear end face of the recess, causing the clip to exert an excessive pressing force on the rear end face of the recess. Consequently, the rear end face of the recess is worn with repeated usage.

SUMMARY OF THE INVENTION

The present invention has been devised in view of the situation outlined above, and the issue addressed by the present invention lies in providing a clip-type tensioner with which wear can be reduced to lengthen the lifespan.

The clip tensioner according to a preferred embodiment of the invention is provided with: a housing in which a hole is formed which is open at one end; a piston which is slidably supported in the hole; and a spring which urges the piston so as to protrude from the hole. The ratchet mechanism consists of: a number of rack teeth which are formed on the outer periphery of the piston; a clip having a circular portion whereof the diameter can be enlarged, which elastically engages with the rack teeth in a diametric direction; and a recess provided in the housing and accommodating the clip. The recess has a first face which comes into contact with the clip when the piston advances, allowing the piston to advance, and a seat face which comes into contact with the clip when the piston retracts, thereby holding the clip between the rack teeth and restricting retraction of the piston. An annular member is provided at the second face opposite the first face inside the recess, and the annular member has an oblique face which constitutes the seat face of the recess, the oblique face having a higher surface hardness than the second face of the recess.

When slack is produced in the chain during operation, the piston advances under the elastic repelling force of the spring and protrudes outside the housing The clip which has engaged with the rack teeth on the outer periphery of the piston comes into contact with the first face of the recess in the housing at this point, which means that the piston is allowed to advance. On the other hand, when tension in the chain increases during operation, the excessive pressing force from the chain causes the piston to retract, pushing it into the housing The clip which has engaged with the rack teeth on the outer periphery of the piston comes into contact with the seat face of the recess in the housing at this point, which means that retraction of the piston is restricted.

Preferably the seat face is constituted by the oblique face of the annular member which is provided at the second face inside the recess, and the oblique face has a higher surface hardness than the second face of the recess, and therefore wear of the seat face can be reduced, which makes it possible to improve the lifespan of the tensioner. It is unnecessary to use special materials for the housing or to subject the housing to special heat treatment in order to improve the wear resistance of the seat face of the recess, which makes it possible to inexpensively reduce the wear on the seat face.

The annular member is preferably made of a wear resistant material. The annular member can be made of steel, such as carbon steel or stainless steel, for example, or a sintered alloy. The annular member can also be press-fit into the recess.

The housing is preferably made of aluminum, titanium or magnesium, or an alloy or sintered alloy of aluminum, titanium or magnesium. Aluminum, titanium and magnesium are generally soft but lightweight, and therefore the seat face of the recess can be endowed with high hardness by providing the annular member in the recess of the housing, while the tensioner as a whole can be made lighter. The housing may also be made of an alloy (including a sintered alloy) of aluminum, titanium or magnesium.

With the clip-type tensioner according to a preferred embodiment of the present invention, when the excessive pressing force from the chain during operation causes the piston to retract and to be pushed inside the housing, the clip which has engaged with the rack teeth on the outer periphery of the piston comes into contact with the seat face of the recess in the housing so that retraction of the piston is restricted, but in this case the seat face consists of the oblique face of the annular member which is provided at the second face of the recess, and the surface hardness of the oblique face is greater than the surface hardness of the second face of the recess, and therefore wear of the seat face can be reduced, and the lifespan of the tensioner can be improved.

DESCRIPTION OF THE PREFERRED EMBODIMENTS

Figure 1:
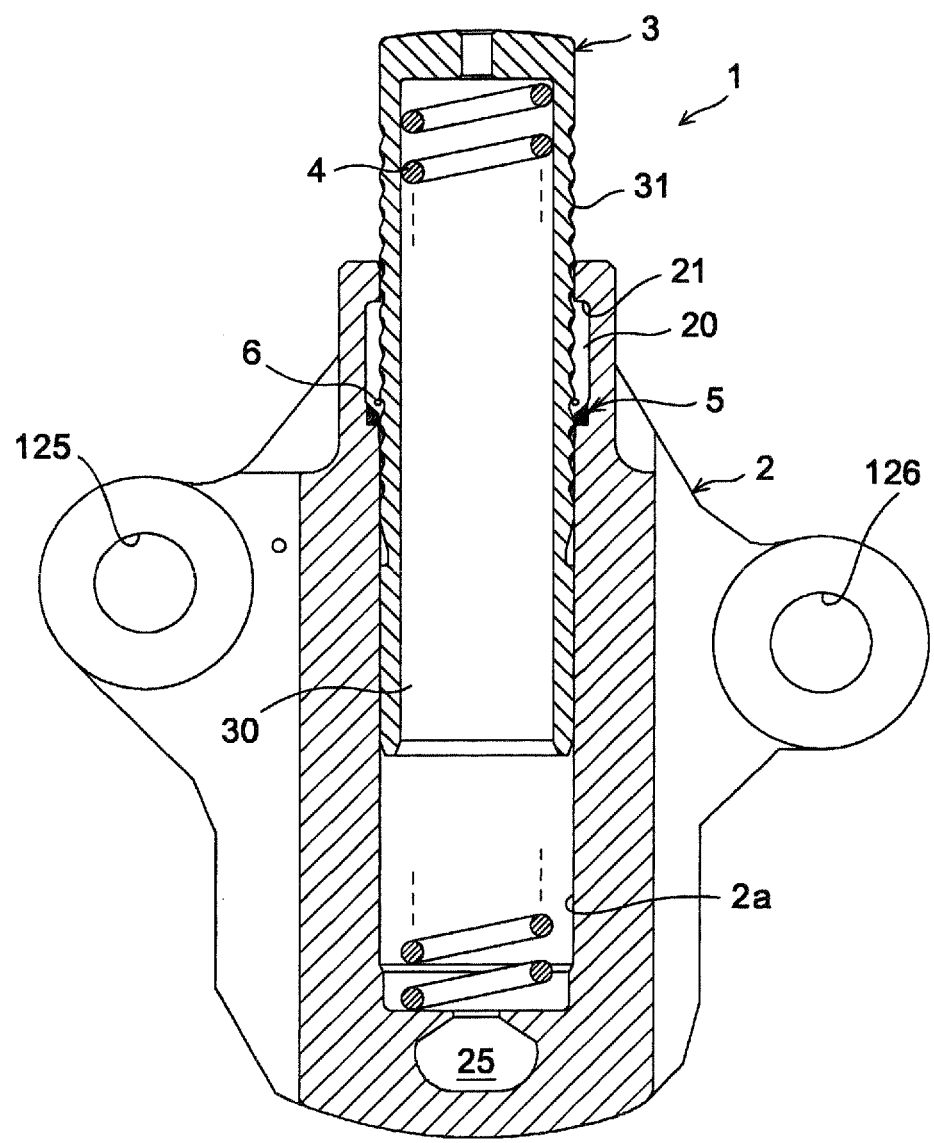
FIG. 1 is a view in longitudinal section of the clip-type tensioner according to an exemplary embodiment of the present invention.
Figure 2:
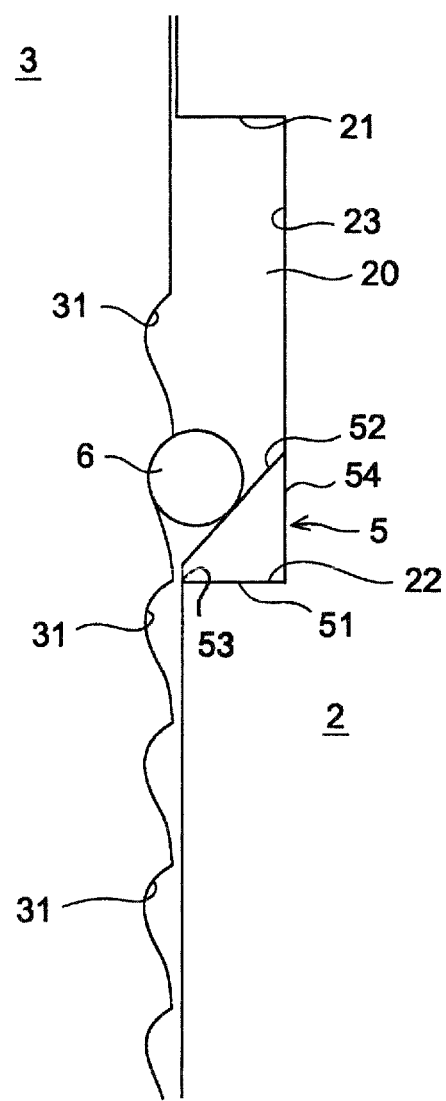
FIG. 2 shows an enlargement of some of the rack teeth of the piston and illustrates the operational effects of this exemplary embodiment.
Figure 3:
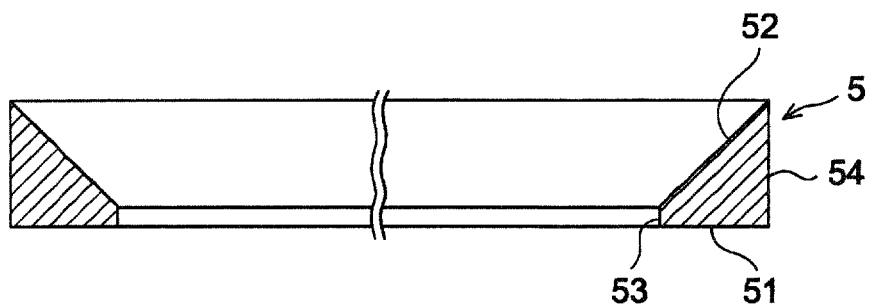
FIG. 3 is a view in longitudinal section of the annular member

FIGS. 1 to 3 illustrate a clip-type tensioner according to an exemplary embodiment of the present invention, where FIG.

1 is a view in longitudinal section of the clip-type tensioner according to this exemplary embodiment, FIG. 2 shows an enlargement of some of the rack teeth of the piston and illustrates the operational effects of this exemplary embodiment, and FIG. 3 is a view in longitudinal section of the annular member.

As shown in FIG. 1, a clip-type tensioner 1 has: a housing 2 made of aluminum, for example, in which is formed a hole 2a which is open at one end; a hollow piston 3 which is slidably supported in the hole 2a of the housing 2; and a spring 4 for urging the piston 3 so as to protrude from the hole 2a (only part of this spring is depicted). Moreover, the material from which the housing 2 is made is not limited to aluminum—it may be titanium or magnesium, or an alloy (sintered alloy) thereof.

An oil passage 25 for supplying the oil from a hydraulic pressure supply source (not depicted) to a chamber 30 which is formed by the space inside the hole 2a in the housing 2 and the piston 3 is formed at the bottom of the housing 2. Furthermore, screw holes 125, 126 into which mounting screws for mounting the tensioner 1 are inserted are provided on the housing 2.

A number of rack teeth 31 are formed on the outer periphery of the piston 3. A clip 6 having a circular portion whereof the diameter can be enlarged, which elastically engages with the rack teeth 31 in a diametric direction is fitted on the rack teeth 31. A recess 20 is formed on the inner peripheral surface at the upper part of the housing 2. The clip 6 is accommodated inside the recess 20.

As shown in FIG. 2, the recess 20 has a first face 21 which is formed at the upper end, and a second face 22 which is formed at the lower end and lies opposite the first face 21. An annular member 5 is provided at the second face 22. As shown in FIG. 3, the annular member 5 has a flat bottom face 51, an oblique face 52 shaped like an inverted cone which is formed above the flat face, and inner and outer cylindrical peripheral faces 53, 54.

The outer peripheral face 54 of the annular member 5 is press-fitted at a side wall 23 of the recess 20 in the housing 2, and the bottom face 51 of the annular member 5 is in contact with the second face 22 of the recess 20. The oblique face 52 of the annular member 5 constitutes the seat face 52 with which the clip 6 can make contact inside the recess 20. The seat face 52 has a higher surface hardness than the second face 22 of the recess 20.

The annular member 5 is preferably made of a wear resistant material. To be more specific, the annular member 5 is made of a steel material, such as carbon steel or stainless steel, for example, or a sintered alloy.

The rack teeth 31 have a bottom part of maximum depth which is formed at a position toward the front end of the piston, and a gently inclined face which is a continuation of the bottom part and is formed at a position toward the rear end of the piston. The clip 6 is seated in the bottom part of the rack teeth 31.

When the piston 3 advances with the clip 6 fitted in the rack teeth 31 of the piston 3, the first face 21 of the recess 20 is in contact with the clip 6, allowing the piston 3 to advance; when the piston 3 retracts with the clip 6 fitted in the rack teeth 31 of the piston 3, the seat face 52 is in contact with the clip 6 which is held between the rack teeth 31 so that retraction of the piston 3 is restricted. The ratchet mechanism consists of the rack teeth 31, the first face 21, the seat face 52, and the clip 6.

The operational effects of this exemplary embodiment will be described next.

First of all, when slack is produced in the chain (not depicted) during operation, the piston 3 advances under the elastic repelling force of the spring 4 and protrudes from the hole 2a in the housing 2, while the clip 6 which has engaged with the rack teeth 31 on the outer periphery of the piston moves together with the piston 3. At this point, if there is a large amount of movement of the piston 3, the clip 6 comes into contact with the first face 21 of the recess 20 in the housing 2 and only the piston 3 advances from this state, removing slack from the chain.

Next, when the tension in the chain increases during operation, the excessive pressing force from the chain causes the piston 3 to retract, pushing it into the hole 2a in the housing 2, and the clip 6 which has engaged with the rack teeth 31 on the outer periphery of the piston moves together with the piston 3. Then, when the clip 6 comes into contact with the seat face 52 of the recess 20 in the housing 2, the clip 6 is held between the rack teeth 31 and the seat face 52 (see FIG. 2), whereby retraction of the piston 3 is restricted.

While the invention described in connection with various embodiments, it will be understood that the invention is not limited to those embodiments. On the contrary, the invention covers all alternatives, modifications, and equivalents as may be included within the spirit and scope of the appended claims.

In this case, the seat face 52 is constituted by the oblique face 52 of the annular member 5 which is provided at the second face 22 inside the recess 20, and the oblique face 52 has a higher surface hardness than the second face 22 of the recess 20, and therefore wear of the seat face 52 can be reduced, which makes it possible to improve the lifespan of the tensioner. Furthermore, in this case, it is unnecessary to make the whole of the housing 2 out of special materials or to subject the housing 2 to special heat treatment in order to improve the wear resistance of the seat face 52 of the recess 20, which makes it possible to inexpensively reduce the wear on the seat face.

Furthermore, when the housing is made from aluminum, titanium or magnesium, these materials are generally soft but lightweight, and therefore the seat face 52 of the recess 20 can be endowed with high hardness by providing the annular member 5 in the recess 20, while the tensioner as a whole can be made lighter.

The invention claimed is:

1. A clip-type tensioner mechanism comprising:
a one-piece housing having a dead-end bore open at one end;
a piston member slidably supported in said bore;
a spring member biasing said piston member in a direction to protrude from said one end of said bore;
a ratchet mechanism having a plurality of rack teeth formed on the outer periphery of said piston member and a clip member in elastic engagement with said rack teeth in a diametric direction;
an annular radially inwardly facing recess formed in said bore;
said clip member positioned in said recess;
said recess having a first face and a second face opposite said first face, said first face extending radially substantially perpendicular to the longitudinal direction of said housing and positioned to contact said clip member when said piston member advances in the protruding direction and to prevent said clip member from egress from said recess;
said second face being parallel to said first face and extending radially substantially perpendicular to the longitudinal direction of said housing;

an annular member press-fitted into said recess and in contact with said second face; said annular member having an oblique seat face;

wherein said clip member comes into contact with said seat face when said piston member retracts and further retraction of said piston member in said housing is restricted;

said housing being made of a material with a first hardness;

said annular member being made of a material with a second hardness;

said second hardness being greater than said first hardness;

wherein wear on the seat face is reduced.

2. The clip-type tensioner according to claim 1, wherein said annular member is made of a wear resistant material.

3. The clip-type tensioner according to claim 1, wherein said annular member is made of steel or a sintered alloy.

4. The clip-type tensioner according to claim 1, wherein said housing is made of aluminum, titanium or magnesium, or an alloy or sintered alloy of aluminum, titanium or magnesium.

\* \* \* \* \*